United States Patent
Oya et al.

(10) Patent No.: US 9,366,792 B2
(45) Date of Patent: Jun. 14, 2016

(54) UNIAXIALLY STRETCHED MULTI-LAYER LAMINATE FILM

(75) Inventors: Taro Oya, Anpachi-gun (JP); Mitsumasa Ono, Anpachi-gun (JP); Tetsuo Yoshida, Anpachi-gun (JP)

(73) Assignee: Teijin Dupont Films Japan Limited, Tokyo (JP)

( * ) Notice: Subject to any disclaimer, the term of this patent is extended or adjusted under 35 U.S.C. 154(b) by 0 days.

(21) Appl. No.: 14/349,207

(22) PCT Filed: Oct. 20, 2011

(86) PCT No.: PCT/JP2011/074736
§ 371 (c)(1),
(2), (4) Date: Apr. 2, 2014

(87) PCT Pub. No.: WO2013/057845
PCT Pub. Date: Apr. 25, 2013

(65) Prior Publication Data
US 2014/0287211 A1 Sep. 25, 2014

(51) Int. Cl.
*G02B 5/30* (2006.01)
*B32B 27/36* (2006.01)
(Continued)

(52) U.S. Cl.
CPC .............. *G02B 5/305* (2013.01); *B29C 55/023* (2013.01); *B29C 55/04* (2013.01); *B32B 7/02* (2013.01);
(Continued)

(58) Field of Classification Search
CPC ........ G02B 5/30; G02B 5/3083; G02B 5/305; B29C 55/023; B29C 55/04; B32B 27/08; B32B 27/36; B32B 7/02; B32B 2250/244; B32B 2250/05; B32B 2250/42; B32B 2307/418; B32B 2307/516; B32B 2457/202; C08J 5/24; C08J 2375/04; B29K 2067/00; G02F 1/133528; Y10T 428/24975
USPC ....... 349/62, 96; 428/216; 252/587; 359/487, 359/96, 489, 488.01
See application file for complete search history.

(56) References Cited

U.S. PATENT DOCUMENTS 4,427,741 A * 1/1984 Aizawa ................ G02B 5/3033
349/117
5,486,949 A 1/1996 Schrenk et al.
(Continued)

FOREIGN PATENT DOCUMENTS

CN 1189127 A 7/1998
CN 1476384 A 2/2004
(Continued)

OTHER PUBLICATIONS

Communication dated Apr. 21, 2015 from the European Patent Office in counterpart application No. 11874313.7.
(Continued)

*Primary Examiner* — Aaron Austin
*Assistant Examiner* — Michael Zhang
(74) *Attorney, Agent, or Firm* — Sughrue Mion, PLLC (57) ABSTRACT

A uniaxially stretched multi-layer laminate film includes 251 or more layers in which a first layer and a second layer are alternately laminated, wherein the first layer is composed of a polyester containing a 2,6-naphthalene dicarboxylic acid component; the second layer is composed of a thermoplastic resin having an average refractive index of 1.60 or more and not more than 1.65 and having negative optical anisotropy or isotropy; an S polarization component has an average reflectance of 90% or more relative to the incident polarized light at an angle of incidence of 0 degree and 50 degrees, respectively; and a P polarization component has an average reflectance of not more than 15% relative to the incident polarized light at an angle of incidence of 0 degree and an average reflectance of 20% or more relative to the incident polarized light at an angle of incidence of 50 degrees.

11 Claims, 3 Drawing Sheets

(51) Int. Cl.
*B29C 55/02* (2006.01)
*B29C 55/04* (2006.01)
*C08J 5/24* (2006.01)
*B32B 7/02* (2006.01)
*B32B 27/08* (2006.01)
*B29K 67/00* (2006.01)
*G02F 1/1335* (2006.01)

(52) U.S. Cl.
CPC ............... *B32B 27/08* (2013.01); *B32B 27/36* (2013.01); *C08J 5/24* (2013.01); *G02B 5/3083* (2013.01); *B29K 2067/00* (2013.01); *B32B 2250/05* (2013.01); *B32B 2250/244* (2013.01); *B32B 2250/42* (2013.01); *B32B 2307/418* (2013.01); *B32B 2307/516* (2013.01); *B32B 2457/202* (2013.01); *C08J 2375/04* (2013.01); *G02F 1/133528* (2013.01); *Y10T 428/24975* (2015.01)

(56) References Cited

U.S. PATENT DOCUMENTS

| | | | | |
|---|---|---|---|---|
| 5,699,188 | A * | 12/1997 | Gilbert | B32B 27/36 359/489.15 |
| 6,025,897 | A | 2/2000 | Weber et al. | |
| 6,565,982 | B1 * | 5/2003 | Ouderkirk | B32B 17/10018 359/584 |
| 6,677,031 | B1 | 1/2004 | Murooka et al. | |
| 7,094,461 | B2 * | 8/2006 | Ruff et al. | 428/212 |
| 7,492,516 | B2 | 2/2009 | Takahashi et al. | |
| 8,339,707 | B2 | 12/2012 | Oya et al. | |
| 2002/0005986 | A1 | 1/2002 | Hebrink et al. | |
| 2004/0069977 | A1 * | 4/2004 | Oya et al. | 252/587 |
| 2004/0076844 | A1 * | 4/2004 | Tojo et al. | 428/480 |
| 2004/0126549 | A1 | 7/2004 | Ruff et al. | |
| 2006/0262401 | A1 | 11/2006 | Takahashi et al. | |
| 2007/0195412 | A1 * | 8/2007 | Oya | B32B 7/02 359/487.05 |
| 2007/0264447 | A1 * | 11/2007 | Oya | B32B 7/02 428/1.31 |
| 2009/0079909 | A1 * | 3/2009 | Ouderkirk | B29C 55/023 349/67 |
| 2012/0207993 | A1 * | 8/2012 | Joo et al. | 428/216 |

FOREIGN PATENT DOCUMENTS

| | | |
|---|---|---|
| EP | 0962807 A2 | 12/1999 |
| EP | 1164008 A1 | 12/2001 |
| JP | 4268505 A | 9/1992 |
| JP | 09-506984 A | 7/1997 |
| JP | 9506837 A | 7/1997 |
| JP | 2003-511729 A | 3/2003 |
| JP | 2004-318060 A | 11/2004 |
| JP | 2011-118190 A | 6/2011 |
| TW | I409170 B | 9/2013 |
| WO | 9517303 A1 | 6/1995 |
| WO | 97/01439 A1 | 1/1997 |
| WO | 0147711 A1 | 7/2001 |
| WO | 2005/088363 A1 | 9/2005 |
| WO | WO 2011043623 A2 * | 4/2011 |
| WO | 2011/074701 A1 | 6/2011 |

OTHER PUBLICATIONS

Communication dated May 6, 2015 from the European Patent Office in counterpart application No. 11874313.7.

* cited by examiner

UNIAXIALLY STRETCHED MULTI-LAYER LAMINATE FILM

CROSS REFERENCE TO RELATED APPLICATION

This application is a National Stage of International Application No. PCT/JP2011/074736, filed Oct. 20, 2011, the contents of which are incorporated herein by reference in their entirety.

TECHNICAL FIELD

The present invention relates to a uniaxially stretched multi-layer laminate film which selectively reflects a fixed polarization component and selectively transmits a polarization component in the perpendicular direction to the former polarization component. In more detail, the present invention relates to a uniaxially stretched multi-layer laminate film having a greatly enhanced brightness in the front direction by selectively reflecting a fixed polarization component relative to angles of incidence from the film front and oblique directions and selectively transmitting a polarization component in the perpendicular direction to the former polarization component relative to an angle of incidence from the film front direction, thereby bringing a fixed reflection relative to an angle of incidence from the film oblique direction.

BACKGROUND ART

A film which a large number of a layer having a low refractive index and a layer having a high refractive index are alternately laminated can be formed into an optical interference film which selectively reflects or transmits a light having a specific wavelength due to structural optical interference between the layers. In addition, such a multi-layer laminate film is able to obtain a high reflection comparable to a film using a metal by gradually changing the film thickness or stacking a film having a different reflection peak and can also be used as a metal luster film or a reflection mirror. Furthermore, by stretching such a multi-layer laminate film to only one direction, the stretched film can reflect only a specific polarization component, whereas it is able to transmit a polarization component in the orthogonal direction thereto, and it can be used as a polarization reflection film. Therefore, such a multi-layer laminate film is used as a brightness enhancing film for liquid crystal displays or the like.

In general, in a multi-layer optical film constituted of layers having a layer thickness of 0.05 to 0.5 μm and having a different refractive index from each other, there is found a phenomenon of increased reflection in which a light having a specific wavelength is reflected due to a difference in refractive index between a layer constituting a one-sided layer and a layer constituting the other-sided layer, the film thickness, and the number of layers. In general, its reflection wavelength is expressed according to the following equation.

$$\lambda = 2(n_1 \times d_1 + n_2 \times d_2)$$

(In the foregoing equation, λ represents a reflection wavelength (nm); $n_1$ and $n_2$ represent refractive indices of the layers, respectively; and $d_1$ and $d_2$ represent thicknesses (nm) of the layers, respectively.)

For example, as shown in Patent Document 1, only a specific polarization component can be reflected by a method in which by using a resin having a positive stress optical coefficient in a one-sided layer, a refractive index of such a layer is made birefringent by means of uniaxial stretching to bring anisotropy, thereby making a difference in refractive index between the layers in the stretching direction within the film plane large and meanwhile making a difference in refractive index between the layers in the orthogonal direction to the stretching direction within the film plane small.

By utilizing this principle, for example, it is possible to design a reflection polarization film which reflects a polarized light in one direction and transmits a polarized light in the orthogonal direction thereto. At that time, desired birefringency is expressed according to the following equations.

$$n1_x > n2_x, \quad n_y = n2_y$$

(In the foregoing equations, $n1_x$ and $n2_x$ represent refractive indices in the stretching direction in the layers, respectively; and $n_y$ and $n2_y$ represent refractive indices in the orthogonal direction to the stretching direction in the layers, respectively.)

In addition, in Patent Document 2, a multi-layer film in which polyethylene-2,6-naphthalene dicarboxylate (hereinafter sometimes referred to as "2,6-PEN") is used in a layer having a high refractive index, and PEN copolymerized with 30 mol % of a thermoplastic elastomer or terephthalic acid is used in a layer having a low refractive index is exemplified. This exemplifies a reflection polarization film which reflects only a specific polarized light by using a resin having a positive stress optical coefficient in a one-sided layer and using a resin having a very small stress optical coefficient (revelation of birefringence by stretching is extremely small) in the other-sided layer.

Investigations regarding such a reflection polarization film are to pay attention to mainly a difference in refractive index between the layers in the stretching direction and a difference in refractive index between the layers in the orthogonal direction to the stretching direction within the film plane and to reflect a polarized light which does not transmit toward the light source side to reuse the light, thereby increasing the brightness enhancing performance.

Meanwhile, with respect to techniques paying attention to reuse of a polarization component which does not transmit, a reflectance of the polarization component reaches the vicinity of 100%, and therefore, it is the state that it is difficult to further enhance the brightness enhancing performance by merely the method of reusing such a polarized light.

In addition, in Patent Document 3, though a uniaxially stretched multi-layer laminate film in which polyethylene-2,6-naphthalene dicarboxylate and syndiotactic polystyrene are alternately laminated is disclosed, it is concerned with the reflection at only a certain part of wavelength peak and has a high transmittance as a film, but it does not propose a concept of brightness enhancing film.

(Patent Document 1) JP-A-04-268505
(Patent Document 2) JP-T-9-506837
(Patent Document 3) WO01/47711

DISCLOSURE OF THE INVENTION

An object of the present invention is to provide a uniaxially stretched multi-layer laminate film having a greatly enhanced brightness in the front direction as compared with the prior art by not only reusing a polarization component which does not transmit but providing a fixed reflectance relative to a polarization component which enters into the film oblique direction with respect to a polarization component in the orthogonal direction of the polarization component which does not transmit, namely a polarization component which has been transmitted at angles of a wide range in the prior art; and a uniaxially stretched multi-layer laminate film laminate body comprising the same.

In addition, a second object of the present invention is to provide a uniaxially stretched multi-layer laminate film having not only a greatly enhanced brightness in the front direction as compared with the prior art but a small hue shift in the front direction; and a uniaxially stretched multi-layer laminate film laminate body comprising the same.

The present invention is based on the following knowledge. That is, it has been found that in a multi-layer laminate film having a function of reflecting a one-sided polarized light and transmitting a polarized light in the orthogonal direction thereto in a visible light wavelength region, in addition to the conventional high reflection properties of a polarized light in the reflection axis direction, by newly providing a function of selectively transmitting a polarization component of an angle of incidence from the film front direction among polarized lights in the transmission axis direction and reflecting a polarization component which enters from the film oblique direction, it becomes possible to reflect even a polarization component in the transmission axis direction, which outgoes toward the oblique direction, onto the light source side and reuse it, and the front brightness is greatly enhanced.

As a brightness enhancing film for liquid crystal displays, there are the above-described brightness enhancing film reusing a polarized light; a prism sheet in which triangular poles of about 50 microns are arranged on a polyethylene terephthalate film to decrease the brightness in a specific direction, thereby enhancing the front brightness; and the like.

In the present invention, by controlling the birefringence properties of the multi-layer laminate film, an enhancement of the front brightness can be realized by reflecting a light of an angle of incidence in a specific direction, which has been transmitted in the prior art, while undergoing the reuse of a polarized light, and functions of enhancing the front brightness and controlling a viewing angle of a liquid crystal display, which have been carried out in the prior art by a method of combining both members of a brightness enhancing film composed of a multi-layer laminate film with a prism, can be unified.

For that reason, by using the multi-layer laminate film of the present invention as a brightness enhancing film for liquid crystal displays, it becomes possible to increase the efficiency for light utilization while reducing the prism member and to reduce the power consumption of a liquid crystal display. In addition, different from the prism sheet having a three-dimensional shape and the like, the multi-layer laminate film of the present invention can be expected to be unified with other optical film in view of the fact that it is formed in a planar shape.

Specifically, the objects of the present invention are achieved by the following inventions.

1. A uniaxially stretched multi-layer laminate film comprising 251 or more layers in which a first layer and a second layer are alternately laminated, wherein (1) the first layer is a layer composed of a polyester containing a 2,6-naphthalene dicarboxylic acid component as a constituent component and having a thickness of 0.01 µm or more and not more than 0.5 µm, and in a uniaxial stretching direction (X direction), an orthogonal direction (Y direction) to the uniaxial stretching direction within a film plane, and a film thickness direction (Z direction), a difference in refractive index between the Y direction and the Z direction of the first layer is 0.1 or more;

(2) the second layer is a layer composed of a thermoplastic resin as a constituent component and having a thickness of 0.01 µm or more and not more than 0.5 µm, and the thermoplastic resin is a resin having an average refractive index of 1.60 or more and not more than 1.65 and having negative optical anisotropy or isotropy;

(3) on the assumption that the film plane is a reflection plane, a polarization component perpendicular to the incidence plane including the Y direction has an average reflectance of 90% or more at a wavelength of 400 to 800 nm relative to the incident polarized light at an angle of incidence of 0 degree and 50 degrees, respectively; and (4) on the assumption that the film plane is a reflection plane, a polarization component parallel to the incidence plane including the Y direction has an average reflectance of not more than 15% at a wavelength of 400 to 800 nm relative to the incident polarized light at an angle of incidence of 0 degree and an average reflectance of 20% or more at a wavelength of 400 to 800 nm relative to the incident polarized light at an angle of incidence of 50 degrees.

2. The uniaxially stretched multi-layer laminate film as set forth in the above paragraph 1, wherein the negative optically anisotropic resin constituting the second layer is a syndiotactic polystyrene resin, and a polarization component parallel to the incidence plane including the Y direction has an average reflectance of 50% or more at a wavelength of 400 to 800 nm relative to the incident polarized light at an angle of incidence of 50 degrees.

3. The uniaxially stretched multi-layer laminate film as set forth in the above paragraph 2, wherein a ratio of an average layer thickness of the first layer to an average layer thickness of the second layer ((average layer thickness of the first layer)/(average layer thickness of the second layer)) is 0.1 or more and not more than 5.0.

4. The uniaxially stretched multi-layer laminate film as set forth in the above paragraph 1, wherein the isotropic resin constituting the second layer is copolymerized polyethylene naphthalene dicarboxylate in which at least one component of a terephthalic acid component and an isophthalic acid component is copolymerized in an amount in the range of 30 mol % or more and not more than 70 mol based on all of repeating units.

5. The uniaxially stretched multi-layer laminate film as set forth in the above paragraph 4, wherein a ratio of an average layer thickness of the first layer to an average layer thickness of the second layer ((average layer thickness of the first layer)/(average layer thickness of the second layer)) is 1.2 or more and not more than 5.0.

6. The uniaxially stretched multi-layer laminate film as set forth in the above paragraph 4 or 5, wherein a crystal orientation degree of the uniaxially stretched multi-layer laminate film in the film thickness direction is −0.30 or more and not more than 0.05.

7. The uniaxially stretched multi-layer laminate film as set forth in the above paragraph 1, wherein the polyester of the first layer is polyethylene-2,6-naphthalene dicarboxylate.

8. The uniaxially stretched multi-layer laminate film as set forth in the above paragraph 1, wherein both the first layer and the second layer do not contain particles.

9. The uniaxially stretched multi-layer laminate film as set forth in the above paragraph 1, which is used as a brightness enhancing film for liquid crystal displays.

10. A uniaxially stretched multi-layer laminate film laminate body comprising a heat-resistant thermoplastic resin film further laminated on at least one surface of the uniaxially stretched multi-layer laminate film as set forth in any of the above paragraphs 1 to 9.

11. A brightness enhancing film for liquid crystal displays comprising the uniaxially stretched multi-layer laminate film as set forth in any of the above paragraphs 1 to 9.

BRIEF DESCRIPTION OF THE DRAWINGS

FIG. 2 is an example of a graph showing reflectance properties of a uniaxially stretched multi-layer laminate film of the present invention using a syndiotactic polystyrene resin in a second layer; and on the assumption that the film plane is a reflection plane, FIG. 2 is concerned with reflectance properties regarding a polarization component (P polarization component in the present invention) parallel to the incidence plane including a non-stretching direction (Y direction) and a polarization component (S polarization component in the present invention) perpendicular to the incidence plane including a non-stretching direction (Y direction).

FIG. 4 is a graph showing reflectance properties for reference when the incidence plane of a uniaxially stretched multi-layer laminate film of the present invention using a syndiotactic polystyrene resin in a second layer is changed; and when the incidence plane is changed to a direction parallel to the stretching direction (X direction), FIG. 4 is concerned with reflectance properties showing a polarization component (S polarization component in FIG. 4) perpendicular to the incidence plane and a polarization component (P polarization component in FIG. 4) parallel to the incidence plane.

BEST MODE FOR CARRYING OUT THE INVENTION

[Uniaxially Stretched Multi-Layer Laminate Film]

Figure 1:
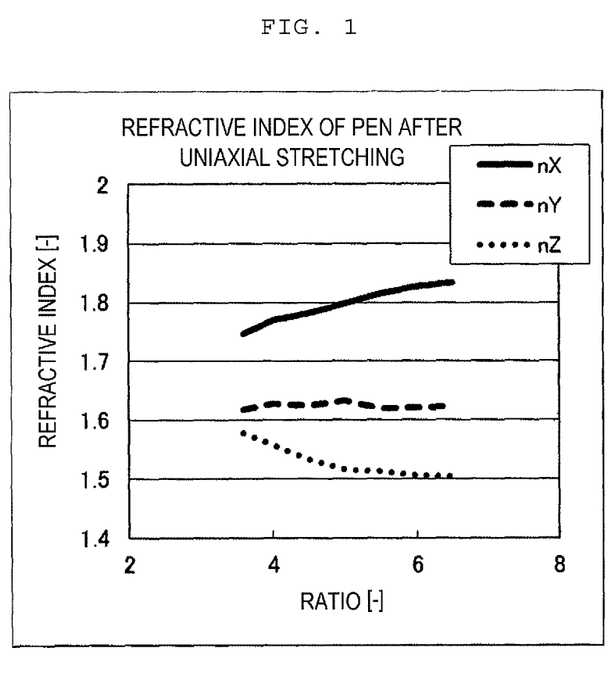
FIG. 1 shows a uniaxial stretch ratio of 2,6-PEN and refractive indices in a stretching direction (X direction), an orthogonal direction (Y direction) to the stretching direction, and a thickness direction (Z direction) after uniaxial stretching (represented by $n_x$, $n_y$, and $n_z$, respectively).
Figure 2:
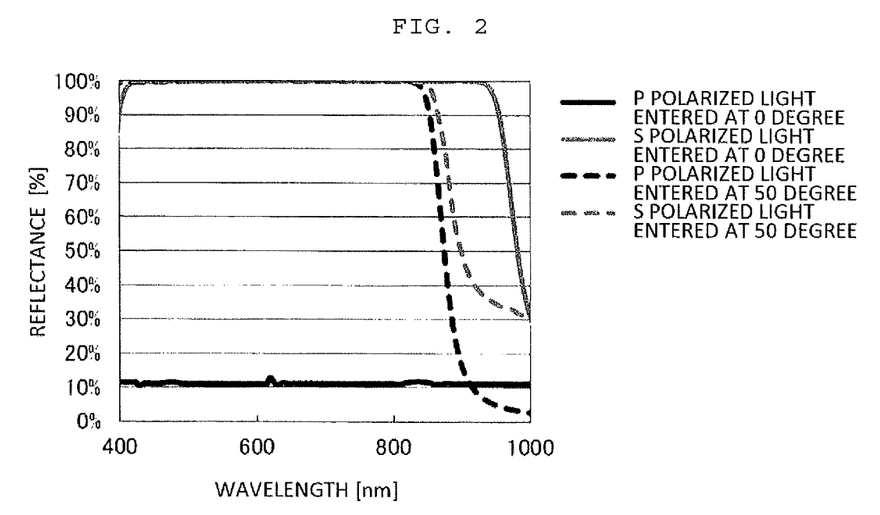
Figure 3:
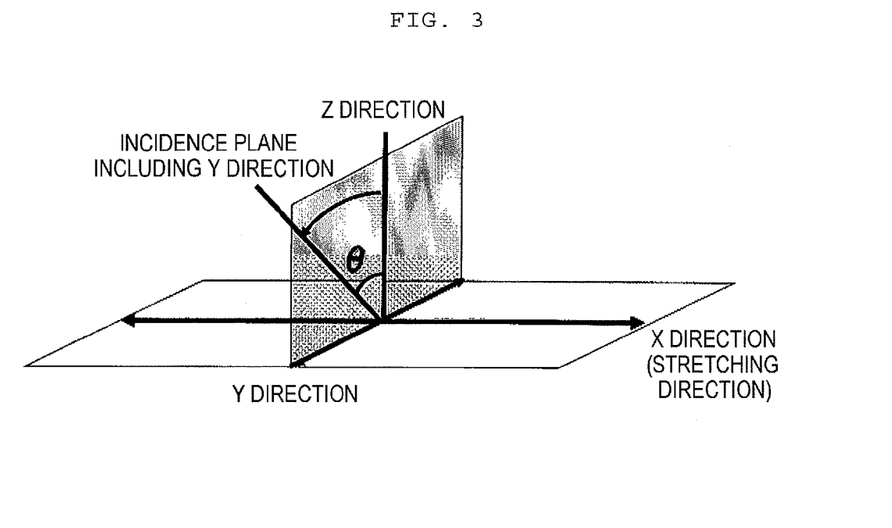
FIG. 3 is an explanatory view regarding the incidence plane (incidence plane including the non-stretching direction (Y direction)=YZ plane) of FIG. 2 and an angle of incidence; and when an angle of incidence in the Z axis direction within this incidence plane is defined as 0 degree, an angle θ which is made on the basis of 0 degree within this incidence plane is corresponding to the angle of incidence.
Figure 4:
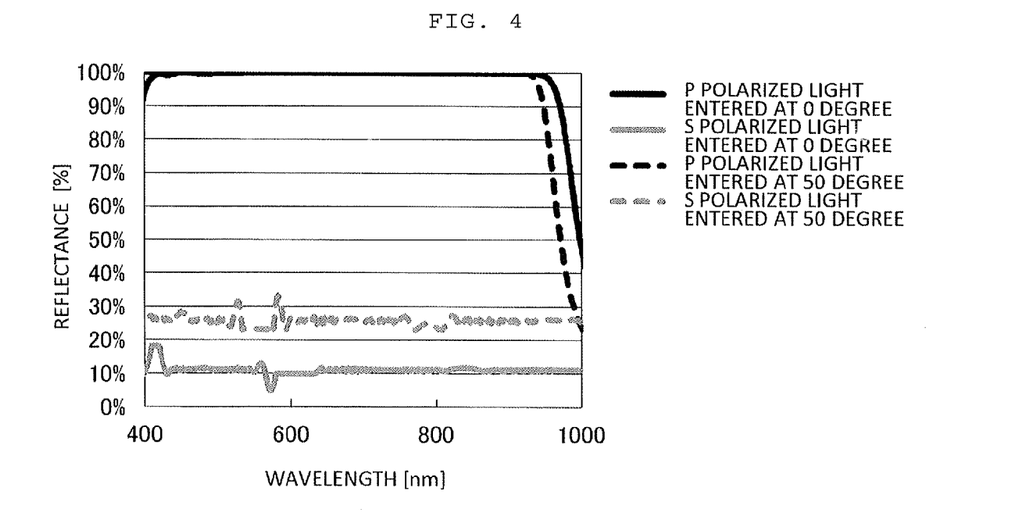
Figure 5:
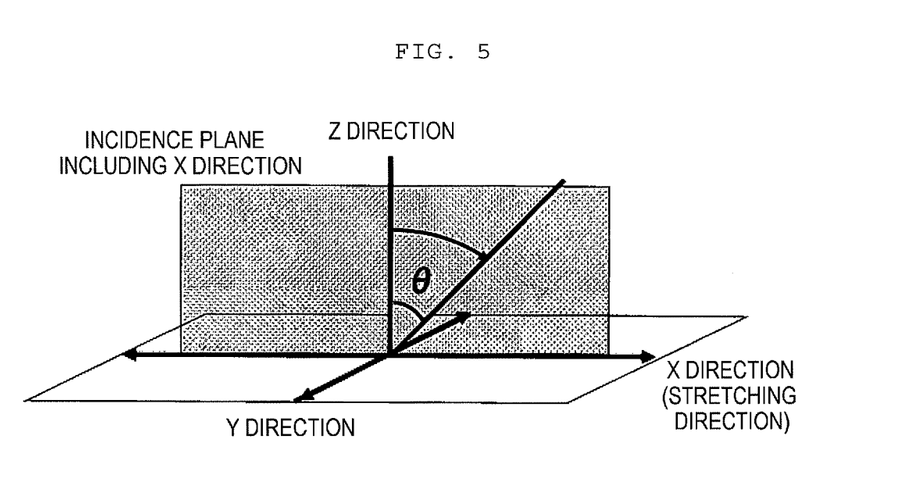
FIG. 5 is an explanatory view regarding the incidence plane (incidence plane including the stretching direction (X direction)=XZ plane) of FIG. 4 and an angle of incidence; and when an angle of incidence in the Z axis direction within this incidence plane is defined as 0 degree, an angle θ which is made on the basis of 0 degree within this incidence plane is corresponding to the angle of incidence.

The uniaxially stretched multi-layer laminate of the present invention is a uniaxially stretched multi-layer laminate film comprising 251 or more layers in which a first layer and a second layer are alternately laminated. The first layer and the second layer constituting the uniaxially stretched multi-layer laminate film of the present invention and reflectance properties are hereunder described.

In the present invention, the first layer is a layer having a higher refractive index than the second layer, and the second layer is a layer having a lower refractive index than the first layer, respectively.

In addition, in the present invention, the reflection plane refers to the film plane. In the present invention, the incidence plane is in a perpendicular relationship to the reflection plane and refers to a plane including an incident ray and a reflected ray. On the assumption that the film plane is the reflection plane, a polarization component parallel to the incidence plane including a non-stretching direction (Y direction) of a uniaxially stretched film is also called "P polarized light" in the present invention. In addition, on the assumption that the film plane is the reflection plane, a polarization component perpendicular to the incidence plane including a non-stretching direction (Y direction) of a uniaxially stretched film is also called "S polarized light" in the present invention.

Furthermore, the angle of incidence is expressed in terms of an angle of incidence relative to the perpendicular direction of the film plane; and in the present invention, the Z direction is defined as 0 degree in the incidence plane including a non-stretching direction (Y direction) of a uniaxially strength film, and an angle taken between an incident ray within this incidence plane and the Z direction is called "angle of incidence".

In addition, in the present invention, the non-stretching direction (Y direction) of a uniaxially stretched film is sometimes called "transmission axis direction", and the stretching direction (X direction) of a uniaxially stretched film is sometime called "reflection axis direction".

[First Layer]

The first layer of the present invention is a layer composed of a polyester containing a 2,6-naphthalene dicarboxylic acid component as a constituent component. By using the polyester containing a 2,6-naphthalene dicarboxylic acid component, large birefringence is caused due to stretching, thereby showing refractive index properties suitable for a reflection polarization film.

Specifically, the polyester containing a 2,6-naphthalene dicarboxylic acid component is preferably a crystalline polyester obtained by polycondensing, as a monomer component, 2,6-naphthalene dicarboxylic acid in an amount of 90 mol % or more based on all of repeating units of the polyester, and furthermore, the content of the 2,6-naphthalene dicarboxylic acid component is more preferably 95 mol % or more. The crystalline polyester referred to herein means a polyester having a melting point.

Specifically, examples of such a polyester include polyethylene-2,6-naphthalene dicarboxylate, polybutylene-2,6-naphthalene dicarboxylate, polypropylene-2,6-naphthalene dicarboxylate, and copolymers thereof. Above all, a polyester in which a main repeating unit thereof is composed of ethylene-2,6-naphthalene dicarboxylate is preferable.

Of these polyesters, in view of the fact that the orientation state is kept in a desired state, polyethylene-2,6-naphthalene dicarboxylate; a polyethylene-2,6-naphthalene dicarboxylate in which 6,6'-(ethylenedioxy)di-2-naphthoic acid, 6,6'-(trimethylenedioxy)di-2-naphthoic acid, or 6,6'-(butylenedioxy)di-2-naphthoic acid is copolymerized as a secondary acid component in an amount of 2 mol % or more and not more than 5 mol % based on all of repeating units of the polyester; or the like is preferable. As other copolymerization components, there are preferably exemplified an acid component, for example, other aromatic carboxylic acids such as isophthalic acid and 2,7-naphthalenedicarboxylic acid, aliphatic dicarboxylic acids such as adipic acid, azelaic acid, sebacic acid, decanedicarboxylic acid, etc., alicyclic dicarboxylic acids such as cyclohexanedicarboxylic acid, etc., and the like; and a glycol component, for example, aliphatic diols such as butanediol, hexanediol, etc., alicyclic diols such as cyclohexanedimethanol, etc., and the like.

A thickness of each layer constituting the first layer is 0.01 μm or more and not more than 0.5 μm. Such a layer thickness can be determined on the basis of a photograph taken using a transmission electron microscope. When each layer constituting the first layer has a layer thickness of such a range, a reflection performance due to interlayer optical interference is revealed in a wavelength region of 400 to 800 nm. When the layer thickness of the first layer exceeds 0.5 µm, the reflection band region becomes an infrared region, whereby usefulness as a reflection polarization film is not obtained. On the other hand, when the layer thickness is less than 0.01 µm, the polyester component absorbs light, whereby a reflection performance is not obtained.

In addition, in a uniaxial stretching direction (X direction) of the film, an orthogonal direction (Y direction) to the uniaxial stretching direction within a film plane, and a film thickness direction (Z direction), a difference in refractive index between the Y direction and the Z direction of the first layer is required to be 0.1 or more.

Here, the refractive index in the Y direction and the refractive index in the Z direction of the first layer are expressed in terms of a value obtained by measuring a refractive index at a wavelength of 633 nm using a prism coupler, manufactured by Metricon Corporation as for the respective directions of the Y direction and the Z direction of a film obtained by melting a polyester constituting the first layer solely and extruding the melt from a die, and then uniaxially stretching the extrudate 5 times at 135° C. to fabricate a uniaxially stretched film.

By using, as the first layer, a birefringent polyester containing 2,6-naphthalene dicarboxylic acid, a difference in refractive index between the Y direction and the Z direction of the first layer becomes large; by using, as the second layer, a thermoplastic resin having an average refractive index of 1.60 or more and not more than 1.65 and having negative optical anisotropy or isotropy, a difference in refractive index between the first layer and the second layer in the Y direction within the film plane becomes small; and among polarization components parallel to the incidence plane including the Y direction, as for a polarized light which enters from the perpendicular direction (incident polarized light at an angle of incidence of 0 degree) and an incident polarized light at an angle close to perpendicularity, a high transmission performance is obtained.

Meanwhile, when the angle of incidence of an incident ray is made oblique, the incidence plane including the Y direction is influenced by not only a difference in refractive index between the layers in the Y direction but a difference in refractive index between the layers in the X direction and a difference in refractive index between the layers in the Z direction, and in the case where the light enters from the oblique direction, the difference in refractive index between the layers becomes large. For that reason, a high reflection performance regarding the polarized light which enters into the oblique direction among the polarization components parallel to the incidence plane including the X direction is obtained, and the front brightness can be greatly enhanced by efficiently reusing this oblique incident light, an aspect of which is a characteristic feature of the present invention.

In order to increase the reflection performance of the polarized light in this oblique direction, it is effective to further make the thickness of the first layer thicker than that of the second layer depending upon the kind of resin.

Examples of a method of setting the difference in refractive index between the Y direction and the Z direction of the first layer to 0.1 or more include a method in which a birefringent polyester containing a 2,6-naphthalene dicarboxylic acid component is used in the first layer, and the film is stretched within the range described in the film production method.

[Second Layer]

The second layer of the present invention is a layer composed of a thermoplastic resin as a constituent component and having a thickness of 0.01 µm or more and not more than 0.5 µm, and the thermoplastic resin is a resin having an average refractive index of 1.60 or more and not more than 1.65 and having negative optical anisotropy or isotropy.

By using a resin having the above-described refractive index properties and having negative refractive anisotropy or isotropy as the thermoplastic resin constituting the second layer, a function of reflecting a polarization component which enters from the film oblique direction among polarized lights parallel to the incidence plane including the Y direction is revealed according to respective mechanisms as described below.

First of all, in the case of using a negative optically anisotropic resin having an average refractive index of 1.60 or more and not more than 1.65 as the second layer, by carrying out uniaxial stretching, there is exhibited so-called negative optical anisotropy in which the refractive index in the stretching direction (X direction) becomes smaller than the average refractive index before stretching, whereas the refractive indices in the orthogonal direction (Y direction) to the uniaxial stretching direction within the film plane and the film thickness direction (Z direction) become larger than the average refractive indices before stretching. When the thermoplastic resin exhibiting such negative optical anisotropy is uniaxially stretched, as for the refractive index of the second layer, the Y direction and the Z direction become larger than the X direction.

By using a polyester containing 2,6-naphthalene dicarboxylic acid in the first layer and a negative optically anisotropic resin having such an average refractive index in the second layer, respectively, the difference in refractive index between the layers of the first layer and the second layer in the X direction can be made large, whereby the difference in refractive index between the first layer and the second layer in the Y direction becomes small. In addition, the difference in refractive index between the layers of the first layer and the second layer in the Z direction becomes large, too due to the properties of the first layer. In the case of a combination of these resins, the difference in refractive index between the layers increases especially in the X direction.

For that reason, with respect to the P polarized light which enters into the oblique direction among polarized lights parallel to the incidence plane including the Y direction, a high reflection performance is obtained due to influences of the differences in refractive index between the layers in all of the X direction, the Y direction, and the Z direction as described above, whereby the front brightness can be greatly enhanced by efficiently reusing a reflected light of this obliquely incident polarized light.

In addition, in the case of using an isotropic resin having an average refractive index of 1.60 or more and not more than 1.65 in the second layer, the second layer has such refractive index properties that the differences in refractive index in the X direction, the Y direction, and the Z direction after uniaxial stretching are small. Specifically, in the present invention, the term "isotropy" refers to the fact that a difference between the average refractive index before stretching and the refractive index after stretching in each of the X direction, the Y direction, and the Z direction is not more than 0.05 in all of the three directions, or a difference in refractive index after stretching in the X direction, the Y direction, and the Z direction is not more than 0.05.

By using an isotropic resin having such refractive index properties in the second layer and the above-described polyester containing a 2,6-naphthalene dicarboxylic acid component as the resin for the first layer, all of the difference in refractive index between the layers of the first layer and the second layer in the X direction and the difference in refractive index between the layers of the first layer and the second layer in the Z direction are large, and the difference in refractive index between the layers of the first layer and the second layer in the Y direction is small. For that reason, in addition to the function of the reflection polarization film of selectively reflecting a polarized light in a specific direction, a reflection performance regarding the P polarized light which enters into the oblique direction can be obtained, an aspect of which is a characteristic feature of the present invention. In addition, in the case of using such an isotropic resin in the second layer, though the difference in refractive index between the layers in the X direction becomes small as compared with the case of using a negative optically anisotropic resin, it is effective to further make the thickness of the first layer thicker than that of the second layer for the purpose of revealing the reflection performance of the P polarized light in the oblique direction. By making the first layer having high plane orientation in the stretching direction relatively thicker than the second layer, the influences of the refractive index properties of the first layer can be increased.

Incidentally, the average refractive index before stretching is a value determined by measuring a refractive index at a wavelength of 633 nm using a prism coupler, manufactured by Metricon Corporation as for the respective directions of the X direction, the Y direction, and the Z direction of a film obtained by melting a thermoplastic resin constituting the second layer solely and extruding the melt from a die to fabricate an unstretched film and specifying an average value thereof as an average refractive index.

In addition, the refractive index in each of the X direction, the Y direction, and the Z direction of the second layer after stretching is a value determined by measuring a refractive index at a wavelength of 633 nm using a prism coupler, manufactured by Metricon Corporation as for the respective directions of the X direction, the Y direction, and the Z direction of a film obtained by melting a thermoplastic resin constituting the second layer solely and extruding the melt from a die, and then uniaxially stretching the extrudate 5 times at 135° C. to fabricate a uniaxially stretched film.

The average refractive index of the thermoplastic resin which is used in the second layer is preferably 1.61 or more and not more than 1.64, and more preferably 1.62 or more and not more than 1.63. Among the above-described resins, a resin in which the refractive indices of the first layer and the second layer in the Y direction after uniaxial stretching are close to each other, and the difference in refractive index in the Y direction is preferably not more than 0.1, and more preferably not more than 0.05 is used.

(Negative Optically Anisotropic Resin)

Examples of the negative optically anisotropic resin having an average refractive index falling within the above-described range include a syndiotactic polystyrene resin, polymethyl methacrylate, maleic anhydride-modified polystyrene, fluorene-modified polycarbonate, and the like. Above all, taking the refractive index in each direction by stretching into consideration, a syndiotactic polystyrene resin is preferable.

The syndiotactic polystyrene resin is a resin having a three-dimensional structure that is a syndiotactic structure, namely a three-dimensional structure in which a phenyl group or a substituted phenyl group as a side chain is positioned alternately in an opposite direction to each other relative to a main chain formed from a carbon-carbon bond, and its tacticity is quantitatively determined by a nuclear magnetic resonance method with a carbon isotope. The tacticity measured by this method can be expressed by an existing proportion of continuing plural constituent units, for example, a dyad in the case of two continuing constituent units, a triad in the case of three continuing constituent units, and a pentad in the case of five continuing constituent units, respectively. Examples of the syndiotactic polystyrene resin as referred to in the present invention include polystyrene, a polyalkylstyrene, a polyhalogenated styrene, a polyalkoxystyrene, and polyvinyl benzoic acid, each having syndiotacticity of 75% or more, and preferably 85% or more in terms of a racemic dyad, or 30% or more, and preferably 50% or more in terms of a racemic pentad; and hydrogenated polymers and copolymers thereof.

In the present invention, the polystyrene resins having such a syndiotactic structure are named generically "syndiotactic polystyrene resin".

Of these, the syndiotactic polystyrene resin is preferably one having a melting point in the range of 220 to 270° C., and more preferably in the range of 240 to 270° C.

In addition, a copolymer can be used as the syndiotactic polystyrene resin, and a copolymer of syndiotactic polystyrene and p-methylstyrene is preferable. Here, a melting point of a syndiotactic polystyrene homopolymer is 270° C., and by adjusting the copolymerization amount of p-methylstyrene, the melting point can be adjusted. When the copolymerization amount of p-methylstyrene is too large, the melting point decreases, and the crystallinity is lowered, too. Such a copolymerization amount is preferably in the range of not more than 20 mol %. When the melting point is lower than 220° C., the crystallinity of the syndiotactic polystyrene resin is excessively lowered, the film formation becomes difficult, and there is a concern that the heat resistance (dimensional change at the time of applying a heat treatment) is lowered.

To the second layer composed of this syndiotactic polystyrene resin, inert particles may be added within a range where the optical properties are not deteriorated. However, it is preferable that the inert particles are not substantially contained.

Atactic polystyrene or isotactic polystyrene is not preferable because its crystallinity is low so that the film formation is difficult, and it does not have a crystal structure, or its structure is loose, so that the heat resistance is poor.

In the polyester containing a 2,6-naphthalene dicarboxylic acid component, its refractive index in the stretching direction increases by stretching. Meanwhile, since the syndiotactic polystyrene resin exhibits negative optical anisotropy, its refractive index in the stretching direction is conversely lowered, whereby the difference in refractive index of the both layers in the X direction can be made large.

Incidentally, a difference in melting point between the layer (first layer) composed of a polyester containing 2,6-naphthalene dicarboxylic acid and the layer (second layer) composed of a resin having negative optical anisotropy in the present invention is preferably within 30° C. When this difference is larger than 30° C., after melting and laminating, at a point of time of solidifying the laminate to form an unstretched sheet, there is a concern that interlayer peeling is caused, or peeling is caused at the time of subsequent stretching.

(Isotropic Resin)

The isotropic resin having an average refractive index falling within the above-described range is not particularly limited so long as it is a thermoplastic resin having such refractive index properties and does not exhibit birefringency after stretching. Examples thereof include a polyester, a polycarbonate, an acrylic resin, and the like. Above all, from the viewpoints of interlayer adhesion and stretchability, a copolymerized polyalkylene naphthalene dicarboxylate is preferable.

Examples of the copolymerized polyalkylene naphthalene dicarboxylate include copolymerized polyethylene naphthalene dicarboxylate and copolymerized polybutylene naphthalene dicarboxylate, in which at least one component of a terephthalic acid component and an isophthalic acid component is copolymerized in an amount in the range of 30 mol % or more and not more than 70 mol % based on all of repeating units. In addition, from the viewpoints of film forming properties and interlayer adhesion to the first layer, it is preferable to use such copolymerized polyethylene naphthalene dicarboxylate in the second layer. The copolymerization amount of such a copolymerized polyester is more preferably 40 mol % or more and not more than 65 mol %.

(Thickness of Each Layer of Second Layer)

A thickness of each layer constituting the second layer is 0.01 μm or more and not more than 0.5 μm. Such a layer thickness can be determined on the basis of a photograph taken using a transmission electron microscope. When each layer constituting the second layer has a layer thickness of such a range, a reflection performance is revealed due to interlayer optical interference in a wavelength region of 400 to 800 nm. When the layer thickness of the second layer exceeds 0.5 m, the reflection band region becomes an infrared region, whereby usefulness as a reflection polarization film is not obtained. On the other hand, when the layer thickness is less than 0.01 μm, the polyester component absorbs light, whereby a reflection performance is not obtained.

[Particles]

The uniaxially stretched multi-layer laminate film of the present invention may contain inert particles having an average particle diameter of 0.01 μm to 2 μm in at least one outermost layer in an amount of 0.001 weight % to 0.5 weight % based on the weight of the layer within a range where such reflection properties are satisfied in order to enhance the windability of the film. In the case of adding inert particles, the average particle diameter of the inert particles is preferably in the range of 0.02 μm to 1 μm, and especially preferably in the range of 0.1 μm to 0.3%. In addition, the content of the inert particles is preferably in the range of 0.02 weight % to 0.2 weight %.

Examples of the inert particles which are contained in the uniaxially stretched multi-layer laminate film include inorganic inert particles such as silica, alumina, calcium carbonate, calcium phosphate, kaolin, and talc; and organic inert particles such as silicone, crosslinked polystyrene, and a styrene-divinylbenzene copolymer. The shape of the particles is not particularly limited so long as it is a generally used shape such as an agglomerated or globular shape, etc.

In addition, the inert particles may be contained in not only the outermost layer but a layer constituted of the same resin as that in the outermost layer within a range where such reflection properties are satisfied. For example, the inert particles may be contained in at least one layer of the first layer and the second layer. In addition, another layer which is different from the first layer and the second layer may be provided as the outermost layer.

In order to achieve more satisfactory optical properties, it is preferable that both of the first layer and the second layer do not contain the particles. When the film does not contain the particles, not only the transmittance to the P polarized light which enters at an angle of incidence of 0 degree is enhanced, but the average reflectance to the P polarized light at a wavelength of 400 to 800 nm can be made small, whereby the front brightness is more enhanced.

[Layer Constitution]

(Number of Layers)

The uniaxially stretched multi-layer laminate film of the present invention is a laminate film in which the above-described first layer and second layer are alternately laminated in the number of layers of 251 or more in total. The number of layers of the uniaxially stretched multi-layer laminate film is preferably 301 or more, more preferably 401 or more, still more preferably 501 or more, and especially preferably 551 or more. When the number of layers is less than the lower limit value, with respect to the average reflectance properties of the polarization component (S polarized light) perpendicular to the incidence plane including the non-stretching direction (Y direction), a fixed average reflectance cannot be satisfied over the wavelength of 400 to 800 nm. Simultaneously, when the number of layers is less than the lower limit value, with respect to the average reflectance properties of the polarization component (P polarized light) parallel to the incidence plane including the non-stretching direction (Y direction) at an angle of incidence of 50 degrees, a fixed average reflectance cannot be satisfied, too over the wavelength of 400 to 800 nm.

From the viewpoints of productivity and handling properties of the film, and the like, an upper limit value of the number of layers is preferably 2,001. From the viewpoints of productivity and handling properties, so long as the average reflectance properties of the present invention are obtained, the number of layers may be further decreased, and for example, the upper limit value of the number of layers may be 1,001 or even 801.

(Average Layer Thickness Ratio of First Layer and Second Layer)

In the case of using the above-described isotropic resin as the thermoplastic resin constituting the second layer, in addition to the refractive index properties in each direction to be caused due to the resin, a ratio of an average layer thickness of the first layer to an average layer thickness of the second layer ((average layer thickness of the first layer)/(average layer thickness of the second layer)) influences the reflection properties of the polarization component which enters obliquely in the P polarized light parallel to the incidence plane including the Y direction. By making the average layer thickness of the first layer thicker than the average layer thickness of the second layer, the reflection of the incident polarized light in the oblique direction can be efficiently reused, and the front brightness can be efficiently increased.

When the ratio of an average layer thickness of the first layer to an average layer thickness of the second layer ((average layer thickness of the first layer)/(average layer thickness of the second layer)) is in the range of 0.5 or more and not more than 5.0, an enhancement rate of front brightness of 150% or more is obtained. In order to obtain an enhancement rate of front brightness of 160% or more, such a layer thickness ratio is preferably 1.2 or more and not more than 5.0. In addition, an upper limit value of such a layer thickness ratio is preferably 4.0, and more preferably 3.5.

When the ratio of an average layer thickness of the first layer to an average layer thickness of the second layer ((average layer thickness of the first layer)/(average layer thickness of the second layer)) exceeds the upper limit value, the optical interference between the layers is lowered, and sufficient reflection properties of the S polarized light cannot be ensured. In addition, when such a layer thickness ratio is less than the lower limit value, the reuse of the obliquely incident light in the P polarized light becomes insufficient, and a great enhancement of the front brightness is not obtained.

In the case of using the above-described negative optically anisotropic resin as the thermoplastic resin constituting the second layer, the reflectance to the obliquely incident light of the P polarized light is enhanced by the refractive index properties of the resin, and a relationship in average layer thickness between the first layer and the second layer is not particularly restricted. However, such a layer thickness ratio ((average layer thickness of the first layer)/(average layer thickness of the second layer)) is preferably in the range of 0.1 or more and not more than 5.0. When this layer thickness ratio falls within such a range, a great enhancement of the front brightness is obtained.

In addition, in the case of a negative optically anisotropic resin, such a layer thickness ratio ((average layer thickness of the first layer)/(average layer thickness of the second layer)) is preferably in the range of 0.2 or more and not more than 3.0, more preferably in the range of 0.3 or more and not more than 3.0, still more preferably 0.5 or more and not more than 2.0, and especially preferably 0.7 or more and not more than 1.5. When this layer thickness ratio falls outside the range of 0.2 or more and not more than 3.0, the hue shift becomes large, so that when the film is used as a brightness enhancing film for liquid crystal displays, there is a concern that the reproducibility of an image becomes poor, and the visibility is lowered.

(Ratio of Maximum Layer Thickness and Minimum Layer Thickness)

In general, in the multi-layer laminate film, the wavelength to be reflected is determined by the refractive index, the number of layers, and the layer thickness. When the laminated first layer and second layer have a fixed thickness, respectively, only a specific wavelength can be reflected. For that reason, in the uniaxially stretched multi-layer laminate film of the present invention, when a ratio of a maximum layer thickness to a minimum layer thickness of each of the first layer and the second layer is 2.0 or more and not more than 5.0, the reflection properties can be increased over the whole visible light region at a wavelength of 400 to 800 nm.

A lower limit value of the ratio of a maximum layer thickness to a minimum layer thickness of each of the first layer and the second layer is more preferably 2.1, and an upper limit value thereof is preferably 4.0, more preferably 3.5, and still more preferably 3.0.

When the ratio of a maximum layer thickness to a minimum layer thickness of each of the first layer and the second layer is less than the lower limit value, with respect to the reflection properties of the S polarized light and the reflection properties of the P polarized light in the oblique direction, desired reflection properties are not obtained over the wavelength region of 400 to 800 nm. On the other hand, when the ratio of a maximum layer thickness to a minimum layer thickness of each of the first layer and the second layer exceeds the upper limit value, the reflection band region becomes too wide, and the average reflectance in the wavelength region of 400 to 800 nm is lowered, and hence, desired reflection properties are not obtained.

The maximum layer thickness and the minimum layer thickness of each of the first layer and the second layer can be determined on the basis of a photograph taken using a transmission electron microscope.

In addition, the first layer and the second layer may be changed in the layer thickness stepwise or continuously.

Examples of a method of obtaining such layer thickness properties include a method in which in alternately laminating the resin for the first layer and the resin for the second layer, a multi-layer feed block apparatus is used, and a thickness of a flow passage of the feed block is continuously changed. In addition, examples of a method of changing the layer thickness stepwise include a method in which a layer having a uniform thickness is laminated by a multi-layer feed block apparatus, a layer having a layer thickness different from the former and having a uniform thickness is further laminated, and those laminate fluids are further laminated, followed by changing the layer thickness stepwise. As an example of the layer constitution in which the layer thickness is changed stepwise, there is exemplified a layer constitution in which the layer thickness is changed in a ratio of 1.0/1.3/2.0.

In addition, a lamination method in which these multi-layer fluids are divided perpendicular to the plane and then again laminated into 251 or more layers may be adopted, and examples thereof include a method in which the number of layers is increased by dividing into three blocks.

(Other Layer)

In the uniaxially stretched multi-layer laminate film of the present invention, besides such first layer and second layer, a thick film layer exceeding 0.5 μm may be present as a surface layer or an interlayer of such a laminate film. When such a thick layer is provided in a part of the alternate layer constitution of the first layer and the second layer, it becomes easy to uniformly adjust the thickness of each layer constituting the first layer and the second layer without affecting the polarization function. Such a thick layer may have the same composition as that in any one of the first layer and the second layer, or may have a composition partially containing such a composition. Such a thick layer does not contribute to the reflection properties because it has a thick layer thickness. Meanwhile, since such a thick layer may possibly influence the transmitted polarized light, it is preferable that particles are not contained in the layer.

(Film Thickness)

A film thickness of the uniaxially stretched multi-layer laminate film of the present invention is preferably 15 μm or more and not more than 150 μm, and more preferably 30 μm or more and not more than 100 μm.

[Uniaxially Stretched Film]

In order to satisfy the optical properties as the desired reflection polarization film, the uniaxially stretched multi-layer laminate film of the present invention is stretched in at least the uniaxial direction. In the uniaxial stretching in the present invention, besides the film stretched in only the uniaxial direction, a film which is biaxially stretched and which is more stretched in one direction is also included. The uniaxial stretching direction (X direction) may be any direction of the longitudinal direction and the width direction of the film. In addition, in the case of a film which is biaxially stretched and which is more stretched in one direction, the direction (X direction) into which the film is more stretched may be any direction of the longitudinal direction and the width direction of the film. From the standpoint of increasing the polarization performance, it is preferable that the direction with a lower stretch ratio is allowed to be one with a stretch ratio of about 1.05 to 1.20. In the case of a film which is biaxially stretched and which is more stretched in one direction, the term "stretching direction" in a relationship with the polarized light or refractive index refers to a direction into which the film is more stretched.

As the stretching method, a known stretching method such as heat stretching with a rod-shaped heater, roll heat stretching, tenter stretching, etc. can be used. From the viewpoints of reduction of the number of scratches formed by contact with the roll, a stretching speed, and the like, tenter stretching is preferable.

[Reflection Properties]

In the uniaxially stretched multi-layer laminate film of the present invention, on the assumption that the film plane is a reflection plane, a polarization component (S polarized light) perpendicular to the incidence plane including the Y direction has an average reflectance of 90% or more at a wavelength of 400 to 800 nm relative to the incident polarized light at an angle of incidence of 0 degree and 50 degrees, respectively (the average reflectance is sometimes named "average reflectance at an angle of incidence of 0 degree" and "average reflectance at an angle of incidence of 50 degrees", respectively).

In addition, on the assumption that the film plane is a reflection plane, a polarization component (P polarized light) parallel to the incidence plane including the Y direction has an average reflectance of not more than 15% at a wavelength of 400 to 800 nm relative to the incident polarized light at an angle of incidence of 0 degree (the average reflectance is sometimes named "average reflectance at an angle of incidence of 0 degree") and an average reflectance of 20% or more at a wavelength of 400 to 800 nm relative to the incident polarized light at an angle of incidence of 50 degrees (the average reflectance is sometimes named "average reflectance at an angle of incidence of 50 degrees").

With respect to the S polarization component, the average reflectance at a wavelength of 400 to 800 nm relative to the incident polarized light at an angle of incidence of 0 degree and 50 degrees, respectively is preferably 95% or more and not more than 100%, and more preferably 98% or more and not more than 100%.

When the average reflectance regarding the S polarization component is less than the lower limit value, the polarization reflection performance as a reflection polarization film is insufficient, and a sufficient performance as a brightness enhancing film for liquid crystal displays or the like is not revealed.

In order to obtain such reflectance properties regarding the S polarization component, in addition to the thickness of each layer and the number of layers, the fact that a difference in refractive index between the first layer and the second layer in the film stretching direction (X direction) is large is exemplified, and the difference in refractive index between the layers is preferably 0.15 or more. Specifically, there is exemplified a method in which stretching into the X direction is carried out in a fixed ratio by using materials exemplified above for the resin for the first layer and the resin for the second layer in the present invention, thereby increasing the birefringency of the first layer. In addition, in order to increase the reflectance within a wide wavelength range at a wavelength of 400 to 800 nm, there is exemplified a method of allowing the ratio of the maximum layer thickness and the minimum layer thickness to fall within the above-described range.

With respect to the P polarization component, the average reflectance at a wavelength of 400 to 800 nm relative to the incident polarized light at an angle of incidence of 0 degree is preferably not more than 13%, and more preferably 5% or more and not more than 13%.

In the case of using the negative optically anisotropic resin of the present invention as the resin for the second layer, with respect to the P polarization component, the average reflectance at a wavelength of 400 to 800 nm relative to the incident polarized light at an angle of incidence of 50 degrees is preferably 50% or more, more preferably 70% or more and not more than 100%, and still more preferably 80% or more and not more than 99%. In the case of using the isotropic resin of the present invention as the resin for the second layer, with respect to the P polarization component, the average reflectance at a wavelength of 400 to 800 nm relative to the incident polarized light at an angle of incidence of 50 degrees is preferably 20% or more and not more than 50%, and more preferably 25% or more and not more than 40%.

With respect to the P polarization component, by making the average reflectance at an angle of incidence of 50 degrees higher than the average reflectance at an angle of incidence of 0 degree and allowing the former to fall within the above-described range while suppressing the average reflectance at an angle of incidence of 0 degree within such a range, the P polarization component which has entered from the oblique direction can be reused upon being reflected to the light source side, and a front brightness enhancing performance higher than that in the conventional brightness enhancing film can be realized.

With respect to the P polarization component, when the average reflectance at a wavelength of 400 to 800 nm relative to the incident polarized light at an angle of incidence of 0 degree exceeds the upper limit value, the polarization transmittance as the reflection polarization film decreases, so that a sufficient performance as a brightness enhancing film for liquid crystal displays or the like is not revealed. Meanwhile, when the average reflectance of the P polarization component at a wavelength of 400 to 800 nm relative to the incident polarized light at an angle of incidence of 50 degrees is less than the lower limit value, the majority of the P polarization component which has entered from the oblique direction transmits through the film as it is, and an amount of the polarized light to be reflected to the light source side is small. Therefore, the reuse efficiency of the P polarized light is not sufficient, and a front brightness enhancing performance higher than that in the conventional reflection polarization film is not obtained.

In order to obtain such reflectance properties regarding the P polarization component, in addition to the thickness of each layer and the number of layers, as described previously, the fact that a difference in refractive index between the layers in the X direction and a difference in refractive index between the layers in the Z direction are large, whereas a difference in refractive index between the layers in the Y direction is small and is preferably not more than 0.02; and the fact that the ratio of the average layer thickness of the first layer to the average layer thickness of the second layer is allowed to fall within a fixed range as described previously, are exemplified.

In addition, in order to increase the reflectance relative to the P polarized light which enters into the oblique direction over a wide wavelength range at a wavelength of 400 to 800 nm, there is exemplified a method of allowing the ratio of the maximum layer thickness and the minimum layer thickness to fall within the above-described range.

In the uniaxially stretched multi-layer laminate film of the present invention, with respect to the S polarization component, a difference between a maximum reflectance and a minimum reflectance in each wavelength at a wavelength of 400 to 800 nm is preferably within 10%, and also, with respect to the P polarization component, a difference between a maximum reflectance and a minimum reflectance in each wavelength at a wavelength of 400 to 800 nm is preferably within 10%. When the difference between a maximum reflectance and a minimum reflectance of each of the above-described polarization components is 10% or more, a hue shift of the reflected or transmitted light is caused, so that there is a concern that in using the film for liquid crystal displays or the like, a problem occurs.

[Crystal Orientation Degree]

In the uniaxially stretched multi-layer laminate film of the present invention, a crystal orientation degree in the film thickness direction is preferably −0.30 or more and not more than 0.05, and more preferably −0.10 or more and not more than 0.00. It is meant that the larger the value of the crystal orientation degree in the film thickness direction, the smaller the plane orientation properties, and the higher the uniaxial orientation properties. When such a crystal orientation degree exceeds the upper limit value, the uniaxial orientation properties are too strong, so that the refractive index properties in the respective directions cannot be satisfied at the same time. On the other hand, when such a crystal orientation degree is less than the lower limit value, the plane orientation becomes excessive, and biaxial orientation properties are generated, whereby the polarization reflection properties of the present invention cannot be obtained.

In the present invention, the crystal orientation degree in the film thickness direction mainly originates in a crystal orientation degree of the polyester resin constituting the first layer, and it is expressed in terms of a crystal orientation degree $f_{010,ND}$ obtained by determining a crystal orientation index $\langle\cos^2 \phi_{010,ND}\rangle$ in the thickness direction (ND) of a crystal plane (010 plane) that is a plane perpendicular to a plane (110 plane) parallel to a naphthalene ring and a plane (206 plane) parallel to the molecular chain direction in a crystal structure of the film with an X ray diffraction apparatus and calculating according to the following equation (1).

$$f_{010,ND} = \frac{2}{3}\langle\cos^2\phi_{010,ND}\rangle - \frac{1}{2} \qquad (1)$$

[Production Method of Uniaxially Stretched Multi-Layer Laminate Film]

Next, the production method of the uniaxially stretched multi-layer laminate film of the present invention is described in detail.

In the uniaxially stretched multi-layer laminate film of the present invention, a polyester containing 2,6-naphthalene dicarboxylic acid (for the first layer) and a thermoplastic resin (for second layer) which reveals the refractive index properties of the second layer of the present invention are extruded in a molten state in a state where they are alternately superimposed in the number of layers of at least 251, thereby forming a multi-layer unstretched film (step of forming a sheet-like material). At that time, the thus laminated laminate composed of 251 or more layers is laminated in such a manner that the thickness of each layer is changed stepwise or continuously in the range of 2.0 times to 5.0 times.

The thus obtained multi-layer unstretched film is stretched at least in a uniaxial direction (X direction) of a film-forming direction or a width direction orthogonal thereto (direction along the film plane). A stretching temperature is preferably in the range of a glass transition point temperature (Tg) of the polyester of the first layer to (Tg+50° C.). At that time, a stretch ratio is preferably 2 to 10 times, more preferably 2.5 to 7 times, still more preferably 3 to 6 times, and especially preferably 4.5 to 5.5 times. When the stretch ratio becomes large, scattering in the plane direction of each layer in the first layer and the second layer becomes small by means of thinning due to stretching, and the optical interference of the stretched multi-layer laminate film becomes uniform in the plane direction, and hence, such is preferable. In addition, the difference in refractive index in the stretching direction and the difference in refractive index in the thickness direction between the first layer and the second layer become large, and hence, such is preferable. At that time, as the stretching method, a known stretching method such as heat stretching with a rod-shaped heater, roll heat stretching, tenter stretching, etc. can be used. From the viewpoints of reduction of the number of scratches formed by contact with the roll, a stretching speed, and the like, tenter stretching is preferable. In addition, in the case where the stretching treatment is also applied to the orthogonal direction (Y direction) to such a stretching direction, thereby undergoing biaxial stretching, it is preferable to control the stretch ratio to about 1.05 to 1.20 times. When the stretch ratio in the Y direction is increased more than this, there is a concern that the polarization performance is lowered. In addition, it is preferable to further apply a heat set treatment after stretching.

[Brightness Enhancing Film]

In view of the fact that the uniaxially stretched multi-layer laminate film of the present invention selectively highly reflects the S polarization component, selectively highly transmits a light in the vicinity of an angle of incidence of 0 degree in the S polarization component and the P polarization component in the perpendicular direction thereto and reflects the P polarization component which has entered in the oblique direction, by using the uniaxially stretched multi-layer laminate film of the present invention as a brightness enhancing film for liquid crystal displays, the reflected S polarization component and P polarization component can be reused, and the front brightness can be greatly enhanced by reusing a part of the P polarized light as compared with the prior art.

In addition, in view of the fact that the multi-layer laminate film itself is provided with such a function, according to the prior art, it was carried out to enhance the front brightness and to control a viewing angle in a liquid crystal display by combining a brightness enhancing film composed of a multi-layer laminate film with a prism sheet, whereas by using the multi-layer laminate film of the present invention, the functions of the both members of the brightness enhancing film and the prism sheet as in the prior art can be unified, it becomes possible to increase the efficiency for light utilization while reducing the members and to reduce the power consumption of a liquid crystal display.

[Uniaxially Stretched Multi-Layer Laminate Film Laminate Body]

In the case of using the uniaxially stretched multi-layer laminate film of the present invention as a brightness enhancing film for liquid crystal displays or the like, from the viewpoint of ensuring the planarity, a heat-resistant thermoplastic resin film can be laminated on at least one surface of the uniaxially stretched multi-layer laminate film of the present invention.

Though the resin constituting the heat-resistant thermoplastic resin film is not particularly limited, examples thereof include a polyester resin, a polycarbonate resin, an acrylic resin, a polyamide resin, and the like. Of these, in particular, from the viewpoints of transparency and heat resistance, a polycarbonate resin is preferable. A high-molecular material which is generically named "polycarbonate" names generically a material in which polycondensation reaction is adopted in its synthesis method, and a main chain thereof is connected through a carbonate bond. Of these, in general, the polycarbonate means a material obtained from a phenol derivative and phosgene, diphenyl carbonate, or the like. In general, though a polycarbonate composed of, as a bisphenol component, 2,2-bis(4-hydroxyphenyl)propane which is named bisphenol A is preferably selected, a polycarbonate copolymer can be constituted by properly selecting various bisphenol derivatives.

Besides this bisphenol A, examples of such a copolymerization component include bis(4-hydroxyphenyl)methane, 1,1-bis(4-hydroxyphenyl)cyclohexane, 9,9-bis(4-hydroxyphenyl)fluorene, 1,1-bis(4-hydroxyphenyl)-3,3,5-trimethylcyclohexane, 2,2-bis(4-hydroxy-3-methylphenyl)propane, 2,2-bis(4-hydroxyphenyl)-2-phenylethane, 2,2-bis(4-hydroxyphenyl)-1,1,1,3,3,3-hexafloropropane, bis(4-hydroxyphenyl)diphenylmethane, bis(4-hydroxyphenyl)sulfide, bis(4-hydroxyphenyl)sulfone, and the like.

A proportion of such a copolymerization component is preferably 2 to 20 mol %, and more preferably 5 to 10 mol % in all of repeating units of the polycarbonate copolymer.

A viscosity average molecular weight of the polycarbonate resin which is used herein is preferably 10,000 or more and not more than 200,000. When the viscosity average molecular weight is lower than 10,000, there may be the case where the mechanical strength of the obtained film is insufficient. In addition, when the molecular weight is high as 200,000 or more, the viscosity of the dope becomes excessively large, so that there is a concern that the handling properties become poor.

As a method of laminating the heat-resistant thermoplastic resin film on at least one surface of the uniaxially stretched multi-layer laminate film, a known technique such as a method in which an adhesive layer is coated on one side of the heat-resistant thermoplastic resin film by a roll coater or the like, and the uniaxially stretched multi-layer laminate film is then stuck at room temperature; a method in which a heat seal layer is coated on one side of the heat-resistant thermoplastic resin film, followed by heat press bonding by a laminator or the like; a method in which a ultraviolet ray-curable resin is coated on one side of the heat-resistant thermoplastic resin film, followed by irradiation with ultraviolet rays; etc. can be properly applied.

EXAMPLES

The present invention is further described by reference to the following Examples. Incidentally, physical properties and characteristics in the Examples were measured or evaluated by the following methods.

(1) Melting Point (Tm) of Resin and Film:

10 mg of a resin or film sample was sampled and measured for a melting point and a glass transition point at a temperature rise rate of 20° C./min by using DSC (a trade name: DSC2920, manufactured by TA Instruments).

(2) Specification of Resin and Specification of Copolymerization Component and Each Component Amount:

With respect to each layer of a film sample, resin components, copolymerization components, and respective component amounts of each film sample were specified by means of $^1$H-NMR measurement.

(3) Thickness of Each Layer:

The film sample was cut out into a size of 2 mm in the film longitudinal direction and 2 cm in the width direction, fixed in an embedding capsule, and then embedded with an epoxy resin (EPOMOUNT, manufactured by Refinetech Co., Ltd.). The embedded sample was vertically cut in the width direction by a microtome (ULTRACUT UCT, manufactured by LEICA) to prepare a thin film slice having a thickness of 5 nm. The thin film slice was observed and photographed by using a transmission electron microscope (S-4300, manufactured by Hitachi, Ltd.) at an accelerating voltage of 100 kV, and the thickness of each layer was measured from the obtained photograph.

In addition, a ratio of a maximum layer thickness to a minimum layer thickness in the first layer and a ratio of a maximum layer thickness to a minimum layer thickness in the second layer were determined, respectively on the basis of the thickness of each of the obtained layers.

In addition, an average layer thickness of the first layer and an average layer thickness of the second layer were determined, respectively on the basis of the thickness of each of the obtained layers, and a ratio of the average layer thickness of the first layer to the average layer thickness of the second layer was calculated.

Incidentally, in the case where an adjustment layer having a thickness exceeding 0.5 μm was present in the outermost layer or the alternate laminate, such an adjustment layer was excluded from the first layer and the second layer, respectively.

(4) Total Film Thickness:

The film sample was held in a spindle detector (K107C, manufactured by Anritsu Corporation) to measure its thickness at 10 different points by using a digital differential electronic micrometer (K351, manufactured by Anritsu Corporation), and an average value thereof was determined and defined as a film thickness.

(5) Refractive Index Before and after Stretching in Each Direction:

Individual resins constituting the respective layers were respectively melted and extruded from a die, followed by casting on a casting drum, thereby obtaining an unstretched film. In addition, the obtained unstretched film was subsequently uniaxially stretched 5 times at 135° C., thereby preparing a stretched film. By using the obtained unstretched film and stretched film, their refractive indices in the stretching direction (X direction), an orthogonal direction (Y direction) to the stretching direction, and the thickness direction (Z direction) ($n_x$, $n_y$, and $n_z$, respectively) were measured at a wavelength of 633 nm using a prism coupler, manufactured by Metricon Corporation, thereby determining a refractive index before stretching and a refractive index after stretching.

The average refractive index before stretching of each layer was determined from an average value of the refractive indices in the three directions before stretching. In addition, the average refractive index after stretching of each layer was determined from an average value of the refractive indices in the three directions after stretching.

(6) Reflectance and Reflection Wavelength:

By using a spectrophotometer (MPC-3100 of Shimadzu Corporation), a polarization filter was set on the light source side, and a total light reflectance relative to an integrating sphere at each wavelength was measured at a wavelength in the range of 400 nm to 800 nm. At that time, a measurement value in the case where a transmission axis of the polarizing filter was aligned in conformity with the non-stretching direction (Y direction) of the film was defined as "polarized light (P polarized light) parallel to the incidence plane including the Y direction", and a measurement value in the case where a transmission axis of the polarizing filter was aligned orthogonal to the non-stretching direction of the film was defined as "polarized light (S polarized light) perpendicular to the incidence plane including the Y direction".

With respect to the respective polarization components, an average value was determined on the basis of reflectance data in the range of 400 to 800 nm and defined as an average reflectance. In addition, the measurement at an angle of incidence of 0 degree was carried out by aligning the film sample such that the light source was positioned perpendicular to the film plane, and the measurement at an angle of incidence of 50 degrees was carried out by aligning the film sample such that the light source was positioned on the extension of such an angle of incidence.

(7) Crystal Orientation Degree:

A crystal orientation index $\langle\cos^2\phi_{ND,010}\rangle$ of the thickness direction (ND) of the crystal plane (010) of the film was determined by using an X ray diffraction apparatus (RO-TAFLEX RINT2500HL, manufactured by Rigaku Corporation), and a crystal orientation degree $f_{010,ND}$ was determined according to the following equation (1).

$$f_{010,ND} = \frac{2}{3}\langle\cos^2\phi_{010,ND}\rangle - \frac{1}{2} \quad (1)$$

Incidentally, the crystal orientation degree in the ND direction was measured using an extreme sample table (multipurpose sample table, manufactured by Rigaku Corporation).

(8) Brightness Enhancing Effect:

The state where optical films (diffusion film and prism sheet) in an LCD panel (VIERA TH-32LZ80, manufactured by Matsushita Electric Industrial Co., Ltd. in 2007) had been taken out was made as reference; the obtained uniaxially stretched multi-layer laminate film was inserted between a liquid crystal cell polarizing plate and a light source of the LCD panel; a front brightness at the time of displaying a white color by PC was measured by an FPD view angle measurement and evaluation device (ErgoScope88), manufactured by Opto Design Inc.; an increase rate of the front brightness after inserting the uniaxially stretched multi-layer laminate film to the front brightness before inserting the uniaxially stretched multi-layer laminate film was calculated; and a front brightness enhancing effect was evaluated according to the following criteria.

AA: The front brightness enhancing effect is 180% or more.

A: The front brightness enhancing effect is 160% or more and less than 180%.

B: The front brightness enhancing effect is 150% or more and less than 160%.

C: The front brightness enhancing effect is 140% or more and less than 150%.

D: The front brightness enhancing effect is less than 140%.

(9) Hue:

The color measurement was carried out by adopting the measurement method of a front brightness enhancing effect, and from a difference of values of hues x and y in the front brightness after inserting the sample film from values of hues x and y in the front brightness before inserting the sample film, the hue was evaluated according to the following criteria.

A: The difference in both x and y is less than 0.03.

B: A maximum change in any of x and y is 0.03 or more.

C. A maximum change in both x and y is 0.03 or more.

(10) Durability Evaluation Test:

On the both surfaces of the obtained uniaxially stretched multi-layer laminate film, a backcoat surface of a light diffusible heat-resistant thermoplastic resin film (OPALUS BS-912, manufactured by Keiwa Inc.) was stuck upon press bonding under a condition at 140° C. and 275 kPa for 2 seconds, thereby fabricating a laminate film; the fabricated laminate film was inserted between a liquid crystal cell polarizing plate and a light source in an LCD panel (VIERA TH-32LZ80, manufactured by Matsushita Electric Industrial Co., Ltd. in 2007); a backlight was allowed to continuously turn on for 3,000 hours; and thereafter, the sheet was take out and visually observed for its appearance, followed by evaluation according to the following criteria.

A: After continuous lighting, the appearance of the film does not change at all, or although a change is perceived in the film after continuous lighting through visual inspection, immeasurable irregularities having a height of less than 0.5 mm are present.

B: In the film after continuous lighting, irregularities having a height of 0.5 mm or more and less than 1 mm are found.

C: In the film after continuous lighting, irregularities having a height of 1 mm or more are found.

Example 1

A syndiotactic polystyrene copolymer in which polyethylene-2,6-naphthalene dicarboxylate (PEN) having an intrinsic viscosity (orthochlorophenol, 35° C.) of 0.62 dL/g as a polyester for the first layer was copolymerized with 8 mol % of p-methylstyrene as a thermoplastic resin for the second layer was prepared.

Subsequently, the polyester for the first layer was dried at 170° C. for 5 hours, and the resin for the second layer was dried at 100° C. for 3 hours, and the both were then supplied into first and second extruders, respectively and heated up to 300° C., thereby rendering them in a molten state. The polyester for the first layer was divided into 276 layers, and the resin for the second layers was divided into 275 layers. Thereafter, the resulting layers were introduced into a die while keeping a laminated state thereof and cast on a casting drum by using a multi-layer feed block apparatus designed so as to laminate the first layer and the second layer alternately, allow a ratio of the maximum layer thickness to the minimum layer thickness in each of the first layer and the second layer to change continuously up to 2.2 times in terms of maximum/minimum, and set a ratio of the average layer thickness of the first layer and the average layer thickness of the second layer to 1.0/1.0, thereby fabricating an unstretched multi-layer laminate film having the first layer and the second layer laminated alternatively in a total number of layers of 551, in which a ratio of the average layer thickness of the first layer and the average layer thickness of the second layer was 1.0/1.0.

This multi-layer unstretched film was stretched 5.2 times in the width direction at a temperature of 135° C. and subjected to a heat set treatment at 150° C. for 3 seconds. The obtained film had a thickness of 55 μm.

A resin constitution of each layer and characteristic features of each layer of the obtained uniaxially stretched multi-layer laminate film are shown in Table 1, and physical properties thereof are shown in Table 2.

Examples 2 to 4

Uniaxially stretched multi-layer laminate films were obtained by following the same procedures as those in Example 1, except that the resin composition of each layer was changed as shown in Table 1. A resin constitution of each layer and characteristic features of each layer of the obtained uniaxially stretched multi-layer laminate films are shown in Table 1, and physical properties thereof are shown in Table 2.

Examples 5 and 6

Uniaxially stretched multi-layer laminate films were obtained by following the same procedures as those in Example 1, except that the layer thickness of each layer was changed as shown in Table 1. A resin constitution of each layer and characteristic features of each layer of the obtained uniaxially stretched multi-layer laminate films are shown in Table 1, and physical properties thereof are shown in Table 2.

Comparative Examples 1 to 2

Uniaxially stretched multi-layer laminate films were obtained by following the same procedures as those in Example 1, except that the resin composition of each layer and the production condition were changed as shown in Table 1. A resin constitution of each layer and characteristic features of each layer of the obtained uniaxially stretched multi-layer laminate films are shown in Table 1, and physical properties thereof are shown in Table 2.

TABLE 1

| | First layer | | | Second layer | | | Number of layers of optical interference layer | Thickness Whole thickness [μm] | Layer thickness ratio (first layer/second layer) | First layer Minimum thickness [nm] |
|---|---|---|---|---|---|---|---|---|---|---|
| | Resin | Melting point (° C.) | Number of layers | Resin | Melting point (° C.) | Number of layers | | | | |
| Example 1 | PEN | 269 | 276 | PMS8-SPS | 250 | 275 | 551 | 55 | 1.00 | 62 |
| Example 2 | PEN | 269 | 276 | PMS10-SPS | 245 | 275 | 551 | 55 | 1.00 | 62 |
| Example 3 | PEN | 269 | 276 | SPS | 270 | 275 | 551 | 55 | 1.00 | 62 |
| Example 4 | PEN | 269 | 276 | PMS15-SPS | 233 | 275 | 551 | 55 | 1.00 | 62 |
| Example 5 | PEN | 269 | 276 | PMS8-SPS | 250 | 275 | 551 | 55 | 0.25 | 25 |
| Example 6 | PEN | 269 | 276 | PMS8-SPS | 250 | 275 | 551 | 55 | 0.20 | 21 |
| Comparative Example 1 | PEN | 269 | 276 | APS | — | 275 | 551 | 55 | 1.00 | 62 |
| Comparative Example 2 | PEN | 269 | 276 | IPS | 240 | 275 | 551 | 55 | 1.00 | 62 |

| | Thickness | | | | Stretching in the film-forming direction | | Stretching in the width direction | | Heat set treatment |
|---|---|---|---|---|---|---|---|---|---|
| | First layer | | Second layer | | | | | | |
| | Maximum thickness [nm] | Maximum/ minimum | Minimum thickness [nm] | Maximum thickness [nm] | Maximum/ minimum | Stretch ratio (times) | Temperature (° C.) | Stretch ratio (times) | Temperature (° C.) | Temperature (° C.) |
| Example 1 | 137 | 2.2 | 62 | 137 | 2.2 | 1.0 | — | 5.2 | 135 | 150 |
| Example 2 | 137 | 2.2 | 62 | 137 | 2.2 | 1.0 | — | 5.2 | 135 | 150 |
| Example 3 | 137 | 2.2 | 62 | 137 | 2.2 | 1.0 | — | 5.2 | 135 | 150 |
| Example 4 | 137 | 2.2 | 62 | 137 | 2.2 | 1.0 | — | 5.2 | 135 | 150 |
| Example 5 | 55 | 2.2 | 100 | 220 | 2.2 | 1.0 | — | 5.2 | 135 | 150 |
| Example 6 | 46 | 2.2 | 104 | 229 | 2.2 | 1.0 | — | 5.2 | 135 | 150 |
| Comparative Example 1 | 137 | 2.2 | 62 | 137 | 2.2 | 1.0 | — | 5.2 | 135 | 150 |
| Comparative Example 2 | 137 | 2.2 | 62 | 137 | 2.2 | 1.0 | — | 5.1 | 135 | 150 |

PEN: Polyethylene-2,6-naphthalene dicarboxylate
PMS8-SPS: Syndiotactic polystyrene copolymerized with 8 mol % of p-methylstyrene
PMS10-SPS: Syndiotactic polystyrene copolymerized with 10 mol % of p-methylstyrene
PMS15-SPS: Syndiotactic polystyrene copolymerized with 15 mol % of p-methylstyrene
SPS: Syndiotactic polystyrene homopolymer
APS: Atactic polystyrene
IPS: Isotactic polystyrene

TABLE 2

| | Polymer for the first layer | | | | | | | | Polymer for the second layer | | | |
|---|---|---|---|---|---|---|---|---|---|---|---|---|
| | Refractive index before uniaxial stretching | | | Average refractive index | Refractive index after uniaxial stretching | | | Average refractive index | Refractive index before uniaxial stretching | | | Average refractive index |
| | $n_X$ | $n_Y$ | $n_Z$ | | $n_X$ | $n_Y$ | $n_Z$ | | $n_X$ | $n_Y$ | $n_Z$ | |
| Example 1 | 1.63 | 1.63 | 1.63 | 1.63 | 1.80 | 1.63 | 1.49 | 1.64 | 1.60 | 1.60 | 1.60 | 1.60 |
| Example 2 | 1.63 | 1.63 | 1.63 | 1.63 | 1.80 | 1.63 | 1.49 | 1.64 | 1.60 | 1.60 | 1.60 | 1.60 |
| Example 3 | 1.63 | 1.63 | 1.63 | 1.63 | 1.80 | 1.63 | 1.49 | 1.64 | 1.60 | 1.60 | 1.60 | 1.60 |
| Example 4 | 1.63 | 1.63 | 1.63 | 1.63 | 1.80 | 1.63 | 1.49 | 1.64 | 1.60 | 1.60 | 1.60 | 1.60 |
| Example 5 | 1.63 | 1.63 | 1.63 | 1.63 | 1.80 | 1.63 | 1.49 | 1.64 | 1.60 | 1.60 | 1.60 | 1.60 |
| Example 6 | 1.63 | 1.63 | 1.63 | 1.63 | 1.80 | 1.63 | 1.49 | 1.64 | 1.60 | 1.60 | 1.60 | 1.60 |
| Comparative Example 1 | 1.63 | 1.63 | 1.63 | 1.63 | 1.80 | 1.63 | 1.49 | 1.64 | 1.59 | 1.59 | 1.59 | 1.59 |
| Comparative Example 2 | 1.63 | 1.63 | 1.63 | 1.63 | 1.80 | 1.63 | 1.49 | 1.64 | 1.60 | 1.60 | 1.60 | 1.60 |

TABLE 2-continued

|  | Polymer for the second layer | | | | Optical properties at the time of incidence at 0 degree | | Optical properties at the time of incidence at 50 degrees | | Enhancement rate of front brightness [%] | Hue [%] | Durability evaluation test [%] |
|---|---|---|---|---|---|---|---|---|---|---|---|
|  | Refractive index after uniaxial stretching | | | Average refractive index | Average reflectance | | Average reflectance | | | | |
|  | $n_X$ | $n_Y$ | $n_Z$ |  | S polarization component [%] | P polarization component [%] | S polarization component [%] | P polarization component [%] | | | |
| Example 1 | 1.59 | 1.63 | 1.63 | 1.62 | 99% | 13% | 99% | 97% | AA | A | A |
| Example 2 | 1.60 | 1.63 | 1.63 | 1.62 | 98% | 13% | 99% | 97% | AA | A | A |
| Example 3 | 1.58 | 1.64 | 1.64 | 1.62 | 99% | 13% | 99% | 97% | AA | A | A |
| Example 4 | 1.61 | 1.62 | 1.62 | 1.62 | 99% | 12% | 99% | 97% | AA | A | B |
| Example 5 | 1.59 | 1.63 | 1.63 | 1.62 | 98% | 13% | 99% | 94% | AA | B | A |
| Example 6 | 1.59 | 1.63 | 1.63 | 1.62 | 96% | 13% | 99% | 87% | AA | B | A |
| Comparative Example 1 | 1.59 | 1.59 | 1.59 | 1.59 | 97% | 35% | 99% | 38% | C | C | C |
| Comparative Example 2 | 1.60 | 1.60 | 1.60 | 1.60 | 96% | 34% | 98% | 36% | C | C | B |

Example 7

A polyester in which spherical silica particles (average particle diameter: 0.3 μm, ratio of long diameter to short diameter: 1.02, average deviation of particle diameter: 0.1) were added in an amount of 0.15 wt % based on the weight of the first layer to polyethylene-2,6-naphthalene dicarboxylate (PEN) having an intrinsic viscosity (orthochlorophenol, 35° C.) of 0.62 dL/g was prepared as a polyester for the first layer, and polyethylene-2,6-naphthalene dicarboxylate copolymerized with 64 mol % of terephthalic acid (TA64PEN) having an intrinsic viscosity (orthochlorophenol, 35° C.) of 0.62 dL/g was prepared as a thermoplastic resin for the second layer.

Subsequently, the polyester for the first layer and the polyester for the second layer were respectively dried at 170° C. for 5 hours, and the both were then supplied into first and second extruders, respectively and heated up to 300° C., thereby rendering them in a molten state. The polyester for the first layer was divided into 276 layers, and the resin for the second layers was divided into 275 layers. Thereafter, the resulting layers were introduced into a die while keeping a laminated state thereof and cast on a casting drum by using a multi-layer feed block apparatus designed so as to laminate the first layer and the second layer alternately, allow a ratio of the maximum layer thickness to the minimum layer thickness in each of the first layer and the second layer to change continuously up to 2.2 times in terms of maximum/minimum, and set a ratio of the average layer thickness of the first layer and the average layer thickness of the second layer to 1.0/0.8, thereby fabricating an unstretched multi-layer laminate film having the first layer and the second layer laminated alternatively in a total number of layers of 551, in which a ratio of the average layer thickness of the first layer and the average layer thickness of the second layer was 1.0/0.8

This multi-layer unstretched film was stretched 5.2 times in the width direction at a temperature of 135° C. and subjected to a heat set treatment at 150° C. for 3 seconds. The obtained film had a thickness of 55 m.

A resin constitution of each layer and characteristic features of each layer of the obtained uniaxially stretched multi-layer laminate film are shown in Table 3, and physical properties thereof are shown in Table 4.

Examples 8 to 10 and Comparative Examples 3 to 5

Uniaxially stretched multi-layer laminate films were obtained by following the same procedures as those in Example 7, except that the resin composition of each layer, the layer thickness, and the production condition were changed as shown in Table 3. A resin constitution of each layer and characteristic features of each layer of the obtained uniaxially stretched multi-layer laminate films are shown in Table 3, and physical properties thereof are shown in Table 4.

TABLE 3

|  | First layer | | | Second layer | | | Number of layers of optical interference layer | Thickness | | First layer Minimum thickness [nm] |
|---|---|---|---|---|---|---|---|---|---|---|
|  | Resin | | | Resin | | | | Whole thickness [μm] | Layer thickness ratio (first layer/second layer) | |
|  | Resin | Melting point (° C.) | Number of layers | Resin | Melting point (° C.) | Number of layers | | | | |
| Example 7 | PEN | 269 | 276 | TA64PEN | — | 275 | 551 | 55 | 1.3 | 71 |
| Example 8 | PEN | 269 | 276 | IA45PEN | — | 275 | 551 | 55 | 3.3 | 96 |
| Example 9 | PEN | 269 | 276 | TA62PEN | — | 275 | 551 | 55 | 0.7 | 51 |
| Example 10 | PEN | 269 | 276 | IA40PBN | — | 275 | 551 | 55 | 1.0 | 62 |
| Comparative Example 3 | PEN | 269 | 276 | IA40PET | — | 275 | 551 | 55 | 1.0 | 62 |
| Comparative Example 4 | PEN | 269 | 276 | TA45PEN | — | 275 | 551 | 55 | 0.4 | 36 |
| Comparative Example 5 | PEN | 269 | 276 | TA45PEN | — | 275 | 551 | 55 | 10.0 | 113 |

TABLE 3-continued

|  | Thickness | | | | | Stretching in the film-forming direction | | Stretching in the width direction | | Heat set treatment |
|---|---|---|---|---|---|---|---|---|---|---|
|  | First layer | | Second layer | | | | | | | |
|  | Maximum thickness [nm] | Maximum/ minimum | Minimum thickness [nm] | Maximum thickness [nm] | Maximum/ minimum | Stretch ratio (times) | Temperature (° C.) | Stretch ratio (times) | Temperature (° C.) | Temperature (° C.) |
| Example 7 | 155 | 2.2 | 54 | 119 | 2.2 | 1.0 | — | 5.2 | 135 | 150 |
| Example 8 | 211 | 2.2 | 29 | 64 | 2.2 | 1.0 | — | 5.2 | 135 | 150 |
| Example 9 | 113 | 2.2 | 73 | 161 | 2.2 | 1.0 | — | 5.2 | 135 | 150 |
| Example 10 | 137 | 2.2 | 62 | 137 | 2.2 | 1.0 | — | 5.2 | 90 | 100 |
| Comparative Example 3 | 137 | 2.2 | 62 | 137 | 2.2 | 1.0 | — | 5.2 | 135 | 150 |
| Comparative Example 4 | 78 | 2.2 | 89 | 196 | 2.2 | 1.0 | — | 5.2 | 135 | 150 |
| Comparative Example 5 | 250 | 2.2 | 11 | 25 | 2.2 | 1.0 | — | 5.1 | 135 | 150 |

PEN: Polyethylene-2,6-naphthalene dicarboxylate
PPN: Polytrimethylene naphthalene dicarboxylate
PET: Polyethylene terephthalate
TA: Terephthalic acid
IA: Isophthalic acid

TABLE 4

| | Polymer for the first layer | | | | | | | | Polymer for the second layer | | | |
|---|---|---|---|---|---|---|---|---|---|---|---|---|
| | Refractive index before uniaxial stretching | | | Average refractive index | Refractive index after uniaxial stretching | | | Average refractive index | Refractive index before uniaxial stretching | | | Average refractive index |
| | $n_X$ | $n_Y$ | $n_Z$ | | $n_X$ | $n_Y$ | $n_Z$ | | $n_X$ | $n_Y$ | $n_Z$ | |
| Example 7 | 1.63 | 1.63 | 1.63 | 1.63 | 1.80 | 1.62 | 1.49 | 1.64 | 1.62 | 1.62 | 1.62 | 1.62 |
| Example 8 | 1.63 | 1.63 | 1.63 | 1.63 | 1.80 | 1.63 | 1.49 | 1.64 | 1.63 | 1.63 | 1.63 | 1.63 |
| Example 9 | 1.63 | 1.63 | 1.63 | 1.63 | 1.80 | 1.60 | 1.49 | 1.63 | 1.62 | 1.62 | 1.62 | 1.62 |
| Example 10 | 1.60 | 1.60 | 1.60 | 1.60 | 1.78 | 1.63 | 1.51 | 1.57 | 1.64 | 1.64 | 1.64 | 1.64 |
| Comparative Example 3 | 1.63 | 1.63 | 1.63 | 1.63 | 1.80 | 1.63 | 1.49 | 1.64 | 1.58 | 1.58 | 1.58 | 1.58 |
| Comparative Example 4 | 1.63 | 1.63 | 1.63 | 1.63 | 1.80 | 1.63 | 1.49 | 1.64 | 1.63 | 1.63 | 1.63 | 1.63 |
| Comparative Example 5 | 1.63 | 1.63 | 1.63 | 1.63 | 1.80 | 1.63 | 1.49 | 1.64 | 1.63 | 1.63 | 1.63 | 1.63 |

| | Polymer for the second layer | | | | | Optical properties at the time of incidence at 0 degree Average reflectance | | Optical properties at the time of incidence at 50 degrees Average reflectance | | Enhancement rate of front brightness [%] | Durability evaluation test [%] |
|---|---|---|---|---|---|---|---|---|---|---|---|
| | Refractive index after uniaxial stretching | | | Average refractive index | Crystal orientation degree | S polarization component [%] | P polarization component [%] | S polarization component [%] | P polarization component [%] | | |
| | $n_X$ | $n_Y$ | $n_Z$ | | $f_{010,ND}$ | | | | | | |
| Example 7 | 1.62 | 1.62 | 1.62 | 1.62 | −0.08 | 99% | 13% | 99% | 33% | A | A |
| Example 8 | 1.63 | 1.63 | 1.63 | 1.63 | −0.10 | 98% | 13% | 99% | 24% | A | A |
| Example 9 | 1.62 | 1.62 | 1.62 | 1.62 | −0.04 | 99% | 13% | 99% | 26% | B | A |
| Example 10 | 1.64 | 1.64 | 1.64 | 1.64 | −0.06 | 99% | 12% | 99% | 28% | B | B |
| Comparative Example 3 | 1.58 | 1.58 | 1.58 | 1.58 | −0.06 | 99% | 47% | 99% | 70% | D | C |
| Comparative Example 4 | 1.63 | 1.63 | 1.63 | 1.63 | 0.12 | 98% | 13% | 99% | 18% | C | A |
| Comparative Example 5 | 1.63 | 1.63 | 1.63 | 1.63 | −0.50 | 86% | 12% | 96% | 14% | C | A |

EFFECT OF THE INVENTION

According to the uniaxially stretched multi-layer laminate film of the present invention, in addition to the conventional high reflection properties of a polarized light in the reflection axis direction, by newly providing a function of selectively transmitting a polarization component of an angle of incidence from the film front direction among polarized lights in the transmission axis direction and reflecting a polarization component which enters from the film oblique direction, it becomes possible to reflect even a polarization component in the transmission axis direction which outgoes toward the oblique direction, onto the light source side and reuse it, and the front brightness is greatly enhanced.

INDUSTRIAL APPLICABILITY

In view of the fact that the multi-layer laminate film itself is provided with such a function, according to the prior art, it was carried out to enhance the front brightness and to control a viewing angle in a liquid crystal display by a method of combining a brightness enhancing film composed of a multi-layer laminate film with a prism sheet, whereas by using the multi-layer laminate film of the present invention, the functions of the both members of the brightness enhancing film and the prism sheet in the prior art can be unified, it becomes possible to increase the efficiency for light utilization while reducing the members and to reduce the power consumption of a liquid crystal display.

The invention claimed is:

1. A uniaxially stretched multi-layer laminate film comprising 251 or more layers in which a first layer and a second layer are alternately laminated, wherein
    (1) the first layer is a layer composed of a polyester containing a 2,6-naphthalene dicarboxylic acid component as a constituent component and having a thickness of 0.01 μm or more and not more than 0.5 μm, and in a uniaxial stretching direction (X direction), an orthogonal direction (Y direction) to the uniaxial stretching direction within a film plane, and a film thickness direction (Z direction), a difference in refractive index between the Y direction and the Z direction of the first layer is 0.1 or more;
    (2) the second layer is a layer composed of a thermoplastic resin as a constituent component and having a thickness of 0.01 μm or more and not more than 0.5 μm, and the thermoplastic resin is a resin having an average refractive index of 1.60 or more and not more than 1.65 and having isotropy;
    (3) when the film plane is a reflection plane, a polarization component perpendicular to the incidence plane including the Y direction has an average reflectance of 90% or more at a wavelength of 400 to 800 nm relative to the incident polarized light at an angle of incidence of 0 degree and 50 degrees, respectively; and
    (4) when the film plane is a reflection plane, a polarization component parallel to the incidence plane including the Y direction has an average reflectance of not more than 15% at a wavelength of 400 to 800 nm relative to the incident polarized light at an angle of incidence of 0 degree and an average reflectance of 20% or more at a wavelength of 400 to 800 nm relative to the incident polarized light at an angle of incidence of 50 degrees,
wherein the isotropic resin constituting the second layer is copolymerized polyethylene naphthalene dicarboxylate in which at least one component of a terephthalic acid component and an isophthalic acid component is copolymerized in an amount in the range of 30 mol % or more and not more than 70 mol % based on all of repeating units, and
    wherein a ratio of an average layer thickness of the first layer to an average layer thickness of the second layer ((average layer thickness of the first layer)/(average layer thickness of the second layer)) is 3.3 or more and not more than 5.0.

2. The uniaxially stretched multi-layer laminate film according to claim 1, wherein the isotropic resin constituting the second layer is copolymerized polyethylene naphthalene dicarboxylate in which at least one component of a terephthalic acid component and an isophthalic acid component is copolymerized in an amount in the range of 40 mol % or more and not more than 65 mol % based on all of repeating units.

3. The uniaxially stretched multi-layer laminate film according to claim 2, wherein a ratio of an average layer thickness of the first layer to an average layer thickness of the second layer ((average layer thickness of the first layer)/(average layer thickness of the second layer)) is 3.3 or more and not more than 4.0.

4. The uniaxially stretched multi-layer laminate film according to claim 2, wherein a crystal orientation degree of the uniaxially stretched multi-layer laminate film in the film thickness direction is −0.30 or more and not more than 0.05.

5. The uniaxially stretched multi-layer laminate film according to claim 1, wherein the polyester of the first layer is polyethylene-2,6-naphthalene dicarboxylate.

6. The uniaxially stretched multi-layer laminate film according to claim 1, wherein both the first layer and the second layer do not contain particles.

7. A uniaxially stretched multi-layer laminate film laminate body comprising a heat-resistant thermoplastic resin film further laminated on at least one surface of the uniaxially stretched multi-layer laminate film according to claim 1.

8. A brightness enhancing film for liquid crystal displays comprising the uniaxially stretched multi-layer laminate film according to claim 1.

9. The uniaxially stretched multi-layer laminate film according to claim 3, wherein a crystal orientation degree of the uniaxially stretched multi-layer laminate film in the film thickness direction is −0.30 or more and not more than 0.05.

10. The uniaxially stretched multi-layer laminate film according to claim 1, wherein a crystal orientation degree of the uniaxially stretched multi-layer laminate film in the film thickness direction is −0.30 or more and not more than 0.05.

11. The uniaxially stretched multi-layer laminate film according to claim 1, wherein the isotropic resin constituting the second layer is copolymerized polyethylene naphthalene dicarboxylate in which a terephthalic acid component is copolymerized in an amount in the range of 64 mol % or more and not more than 70 mol % based on all of repeating units.

* * * * *